US006389472B1

(12) United States Patent
Hughes et al.

(10) Patent No.: US 6,389,472 B1
(45) Date of Patent: May 14, 2002

(54) METHOD AND SYSTEM FOR IDENTIFYING AND LOCATING INAPPROPRIATE CONTENT

(75) Inventors: Patrick Alan Hughes, Johnson City, TN (US); Paul Blair Elswick, Jonesville, VA (US)

(73) Assignee: Cornerpost Software, LLC, Duffield, VA (US)

( * ) Notice: Subject to any disclaimer, the term of this patent is extended or adjusted under 35 U.S.C. 154(b) by 0 days.

(21) Appl. No.: 09/570,559

(22) Filed: May 12, 2000

Related U.S. Application Data

(63) Continuation-in-part of application No. 09/062,637, filed on Apr. 20, 1998, now Pat. No. 6,065,055.

(51) Int. Cl.$^7$ .............................................. G06F 13/00
(52) U.S. Cl. ...................................................... 709/229
(58) Field of Search ........................... 707/9; 709/200, 709/202, 203, 210, 211, 217, 218, 219, 225, 226, 227, 229, 232; 713/200, 201, 202

(56) References Cited

U.S. PATENT DOCUMENTS

| | | |
|---|---|---|
| 4,652,990 A | 3/1987 | Pailen et al. |
| 4,745,559 A | 5/1988 | Willis et al. |
| 4,791,565 A | 12/1988 | Dunham et al. |
| 5,263,157 A | 11/1993 | Janis |
| 5,339,403 A | 8/1994 | Parker |
| 5,375,244 A | 12/1994 | McNair |
| 5,388,211 A | 2/1995 | Hornbuckle |
| 5,479,612 A | 12/1995 | Kenton et al. |
| 5,627,967 A | 5/1997 | Dauerer et al. |
| 5,675,782 A | 10/1997 | Montague et al. |
| 5,678,041 A | 10/1997 | Baker et al. |
| 5,696,898 A | 12/1997 | Baker et al. |
| 5,884,033 A * | 3/1999 | Duvall et al. ............... 709/206 |

OTHER PUBLICATIONS

The Internet Filter, Bob Turner, "The Internet Filter," Mar. 11, 1998, 6 pages, http://www.turnercom.com/press1.html, http://turnercom.com/list.
The Cyber Patrol Fact Sheet, The Learning Company, "The Cyber Patrol Fact Sheet," Mar. 11, 1998, 3 pages, http://www.cyberpatrol.com/fact.html.
Cybersitter, Solid Oak Software, Inc., "Cybersitter Product Information," Mar. 11, 1998, 3 pages, http://www.cybersitter.com/cysitter.htm.
Net Nanny Software, Netnanny Software International, Inc., "All About Net Nanny," Mar. 11, 1998, 2 pages, http://www.netnanny.com/allabout/allabout.htm.
SurfWatch, Sequel Technology, "Proserver for Microsoft Proxy Server," Mar. 11, 1998, 3 pages, http://www.surfwatch.com/datasheets/proserver–microsoft/index.html.
CNN Article, CNN & Reuters, "FBI to parents: Internet pedophiles a serious threat," Mar. 11, 1998, 4 pages, http://cnn.com/TECH/computing/9803/11/cyber.stalking/index.html.

* cited by examiner

*Primary Examiner*—Robert B. Harrell
(74) *Attorney, Agent, or Firm*—Hunton & Williams

(57) ABSTRACT

The method and system of the present invention are operative to adaptively fill holes in filter lists. A method and system for managing access to inappropriate content on a public computer network by users of a private computer network including a method and system for adaptively creating or modifying a filter list is disclosed. Users of the private network access content on the public network through an interface. Local memory of the interface is scanned and inappropriate content is identified. The location within the public computer network at which this inappropriate content is found is identified. These locations are then added to a filter list of sites that contain inappropriate content. The method and system can also be used in conjunction with local memory of individual computers.

29 Claims, 14 Drawing Sheets

| FILTER HIT SUMMARY | | |
|---|---|---|
| DATE- HOUR | CLIENT IP ADDR. | HITS |
| 08/21/1997 - 16 | 10.1.1.11 | 3 |
| 08/21/1997 - 12 | 10.1.1.11 | 2 |
| 08/21/1997 - 15 | 10.1.1.11 | 40 |
| 08/27/1997 - 07 | 10.1.1.11 | 1 |
| 08/26/1997 - 14 | 10.1.1.13 | 2 |
| 08/27/1997 - 15 | 10.1.1.13 | 6 |
| 08/27/1997 - 11 | 10.1.1.14 | 3 |
| 08/22/1997 - 12 | 10.1.1.15 | 5 |
| 08/21/1997 - 12 | 10.1.1.15 | 4 |
| 08/26/1997 - 15 | 10.1.1.21 | 1 |
| 08/25/1997 - 15 | 10.2.1.17 | 8 |
| 08/27/1997 - 13 | 10.2.1.22 | 1 |
| 08/25/1997 - 13 | 10.2.1.22 | 2 |
| 08/26/1997 - 13 | 10.2.1.25 | 1 |
| 08/25/1997 - 11 | 10.2.1.25 | 1 |
| 08/25/1997 - 11 | 10.2.1.26 | 2 |
| 08/26/1997 - 11 | 10.2.1.26 | 1 |

ZOOM SPAN IN MINUTES 15   CLOSE

FIG. 14

| FILTER HIT SUMMARY | | |
|---|---|---|
| DATE- HOUR | CLIENT IP ADDR. | HITS |
| 08/21/1997 - 15 | 10.1.1.11 | 40 |
| 08/27/1997 - 14 | 10.7.1.15 | 9 |
| 08/25/1997 - 15 | 10.2.1.17 | 8 |
| 08/26/1997 - 11 | 10.5.1.18 | 6 |
| 08/27/1997 - 15 | 10.1.1.13 | 6 |
| 08/26/1997 - 10 | 10.2.1.27 | 5 |
| 08/27/1997 - 14 | 10.4.1.13 | 5 |
| 08/22/1997 - 14 | 10.6.1.31 | 5 |
| 08/22/1997 - 12 | 10.1.1.15 | 5 |
| 08/27/1997 - 15 | 10.4.1.13 | 4 |
| 08/21/1997 - 12 | 10.1.1.15 | 4 |
| 08/21/1997 - 16 | 10.1.1.11 | 3 |
| 08/26/1997 - 10 | 10.6.1.24 | 3 |
| 08/21/1997 - 08 | 10.3.1.14 | 3 |
| 08/21/1997 - 07 | 10.6.1.33 | 3 |
| 08/21/1997 - 13 | 10.6.1.33 | 3 |
| 08/21/1997 - 09 | 10.3.1.21 | 3 |

ZOOM SPAN IN MINUTES 15   CLOSE

FIG. 15

| ZOOM PROXY LOG | | | | BLOCK ⏋ ⎡ UNBLOCK | |
|---|---|---|---|---|---|
| ▷ CLIENT IP | DATE/TIME | STATUS | HOST NAME | | URL |
| 10.1.1.44 | 8/20/97 2:00:09 PM | OK | www.art21.com | ✕ ✓ | http://www.art21.com/HTML/IMAGESa21-C302.gif |
| 10.1.1.44 | 8/20/97 2:00:09 PM | OK | www.art21.com | ✕ ✓ | http://www.art21.com/HTML/IMAGES/HAND-R.gif |
| 10.1.1.44 | 8/20/97 2:00:08 PM | OK | www.art21.com | ✕ ✓ | http://www.art21.com/ |
| 10.1.1.44 | 8/20/97 1:59:06 PM | BLOCK | – | ✕ ✓ | http://www.hotwired.com/cai-bin/redirect/128/http://www.h |
| 10.1.1.44 | 8/20/97 1:59:05 PM | OK | me1.hotbot.com | ✕ ✓ | http://www.hotbot.com/clickthru.html?id=1604&h=10024At |
| 10.1.1.44 | 8/20/97 1:58:38 PM | BLOCK | – | ✕ ✓ | http://www.xxxratedsex.com/ |
| 10.1.1.44 | 8/20/97 1:58:15 PM | BLOCK | – | ✕ ✓ | http://www.bulldog.sexhound./com?code=20554 |
| 10.1.1.44 | 8/20/97 1:58:15 PM | BLOCK | – | ✕ ✓ | http://w16.hitbox.com/wc/C2391335.cgi |
| 10.1.1.44 | 8/20/97 1:58:08 PM | BLOCK | – | ✕ ✓ | http://bulldog.sexhound./com?code=20554 |
| 10.1.1.44 | 8/20/97 1:58:08 PM | BLOCK | – | ✕ ✓ | http://w16.hitbox.com/wc/C23921335.cgi |
| 10.1.1.44 | 8/20/97 1:57:44 PM | OK | www.sex4all.com | ✕ ✓ | http://207.107.107.233/track.cgi?qpage |
| 10.1.1.44 | 8/20/97 1:57:44 PM | BLOCK | – | ✕ ✓ | http://bulldog.sexhound.com/?code=20554 |
| 10.1.1.44 | 8/20/97 1:57:44 PM | BLOCK | – | ✕ ✓ | http://w16.hitbox.com/wc/C23921335.cgi |
| 10.1.1.44 | 8/20/97 1:57:41 PM | BLOCK | – | ✕ ✓ | http://w16.hitbox.com/wc/C23921335.cgi |
| 10.1.1.44 | 8/20/97 1:57:41 PM | OK | www.sex4all.com | ✕ ✓ | http://207.107.107.233/track.cgi?qpage |
| 10.1.1.44 | 8/20/97 1:57:41 PM | BLOCK | – | ✕ ✓ | http://bulldog.sexhound.com/?code=20554 |

FIG. 16

| ZOOM PROXY LOG | | | | BLOCK ⏋ ⎡ UNBLOCK | |
|---|---|---|---|---|---|
| ▷ MACHINE | DATE/TIME | STATUS | HOST NAME | | URL |
| ▷ BEVERLY | 8/21/97 4:14:47 PM | OK | – | ✕ ✓ | – |
| BEVERLY | 8/21/97 4:14:38 PM | OK | www.eb.com | ✕ ✓ | http://www.eb.com:180/cgi-bin/q?DocF=index/ti/ger/21.htm |
| BEVERLY | 8/21/97 4:14:28 PM | OK | www.eb.com | ✕ ✓ | http://bastion.eb.com/picons/id index.gif |
| BEVERLY | 8/21/97 4:14:25 PM | OK | www.eb.com | ✕ ✓ | http://www.eb.com:180/cgi-bin/q?DocF=micro/594/24.html |
| BEVERLY | 8/21/97 4:14:16 PM | OK | www.eb.com | ✕ ✓ | http://www.eb.com:180/cgi-bin/q?DocF=micro/262/69.html |
| BEVERLY | 8/21/97 4:14:16 PM | OK | bastion.eb.com | ✕ ✓ | http://bastion.eb.com/picons/id micro.gif |
| BEVERLY | 8/21/97 4:14:08 PM | OK | www.eb.com | ✕ ✓ | http://www.eb.com:180/thumbs/obsenvr001m4.gif |
| BEVERLY | 8/21/97 4:14:08 PM | OK | bastion.eb.com | ✕ ✓ | http://bastion.eb.com/picons/hittoo.gif |
| BEVERLY | 8/21/97 4:14:08 PM | OK | bastion.eb.com | ✕ ✓ | http://bastion.eb.com/picons/arrow.gif |
| BEVERLY | 8/21/97 4:14:08 PM | OK | bastion.eb.com | ✕ ✓ | http://bastion.eb.com/picons/id .gif |
| BEVERLY | 8/21/97 4:14:08 PM | OK | www.eb.com | ✕ ✓ | http://www.eb.com:180/cgi-bin/q?keywords=tiger&hits-108 |
| BEVERLY | 8/21/97 4:14:07 PM | OK | bastion.eb.com | ✕ ✓ | http://bastion.eb.com/picons/resbl2.gif |
| BEVERLY | 8/21/97 4:14:07PM | OK | bastion.eb.com | ✕ ✓ | http://bastion.eb.com/picons/bg-.gif |
| BEVERLY | 8/21/97 4:13:59 PM | OK | bastion.eb.com | ✕ ✓ | http://bastion.eb.com/picons/rerefr.gif |
| BEVERLY | 8/21/97 4:13:59 PM | OK | bastion.eb.com | ✕ ✓ | http://bastion.eb.com/picons/refeat.gif |
| BEVERLY | 8/21/97 4:13:58 PM | OK | bastion.eb.com | ✕ ✓ | http://bastion.eb.com/picons/remorer.gif |

FIG. 17

| IP INVENTORY | | | | |
|---|---|---|---|---|
| IP ADDRESS | MACHINE NAME | LOCATION | USER | COMMENT |
| 10.1.1.11 | BEVERLY | CENTRAL OFFICE | | |
| 10.1.1.12 | LYLE | CENTRAL OFFICE | | |
| 10.1.1.13 | GAYLE | CENTRAL OFFICE | | |
| 10.1.1.14 | LORETTA | CENTRAL OFFICE | | |
| 10.1.1.15 | SHEILA | CENTRAL OFFICE | | |
| 10.1.1.16 | JUDITH | CENTRAL OFFICE | | |
| 10.1.1.17 | JANICE | CENTRAL OFFICE | | |
| 10.1.1.18 | BONNIE | CENTRAL OFFICE | | |
| 10.1.1.19 | BRENDA | CENTRAL OFFICE | | |
| 10.1.1.20 | BECKY | CENTRAL OFFICE | | |
| 10.1.1.21 | PAT | CENTRAL OFFICE | | |
| 10.1.1.22 | LAB 1 | CENTRAL OFFICE | | |

METHOD AND SYSTEM FOR IDENTIFYING AND LOCATING INAPPROPRIATE CONTENT

RELATED APPLICATION DATA

This application is a continuation-in-part of U.S. patent application Ser. No. 09/062,637 filed on Apr. 20, 1998, now U.S. Pat. No. 6,065,055, the disclosure of which is hereby incorporated by reference.

FIELD OF THE INVENTION

The invention relates to a method and system for controlling user access to inappropriate content on a network or database, for example, the Internet, by means of content blocking, and in case of attempts to circumvent said control access, notification to an appropriate supervisor, such as a system administrator. More particularly, the present invention is directed to a method and system for identifying and locating inappropriate content.

BACKGROUND OF THE INVENTION

The Internet is a vast collection of resources from around the world with no sort of "central" or main database. Instead it is a collection of thousands of computers, each with their own individual properties and content, linked to a network which is in turn linked to other networks. Many of these computers have documents written in a markup language, such as Hypertext Mark-up Language ("HTML") that are publicly viewable. These HTML documents that are available for public use on the Internet are commonly referred to as "Web Pages". All of the computers that host web pages comprise what is known today as the World Wide Web ("WWW").

The WWW is comprised of an extremely large number of web pages that is growing at an exponential amount every day. A naming convention known as a Uniform Resource Locator ("URL") is used to designate information on the Internet. Web pages are typically assigned to the subclass known as the Hypertext Transport Protocol ("http") while other subclasses exist for file servers, information servers, and other machines present on the Internet. URLs are an important part of the Internet in that they are responsible for locating a web page and hence, for locating desired information. A user may locate a web page by entering the URL into an appropriate field of a web browser. A user may also locate web pages through "linking." When the user accesses any given web page, "links" to other web pages may be present on the web page. This expanding directory structure is seemingly infinite and can result in a single user seeking one web page, and compiling a list of hundreds of new web pages that were previously unknown from the links on the one web page.

Large amounts of information are available on the WWW and are easily accessible by anyone who has Internet access. In many situations it is desirable to limit the amount and type of information that certain individuals are permitted to retrieve. For example, in an educational setting it may be undesirable for the students to view pornographic or violent content while using the WWW.

Until now, schools and businesses have either ignored inappropriate material available on the Internet or attempted to filter it with software originally designed for home use on a single computer. Others have tried to convert their filtering products to proxy servers so that they may filter entire networks. "Yes Lists" and "Content Filtering" are other industry methods, which have found use in this area, albeit with less success. Conventional "filtering" has several inherent flaws, despite the fact that it is considered the best alternative of inappropriate site management. If a filter list is broad enough to ensure complete safety for its users, unthreatening material is inevitably filtered along with material considered to be appropriate. This leads to a reduction in the versatility of the Internet and the possibility of censorship accusations. On the other hand, if the filter list is too narrow, inappropriate material is more likely to pass through to the users. In addition, the filter vendor is in control of defining the filter list. This results in the moral and ethical standards of the vendor being imposed upon the user. Moreover, because new inappropriate sites appear on the Internet at a very rapid pace, and because Internet search engines tend to present newer web sites first, the newer sites that are least likely to be in a filter list are most likely to appear at the top of search results.

A "Yes List" is the safest method of protecting students on the Internet. However, it is the most expensive to administer, and it dramatically reduces the benefits of the Internet in an educational setting by being the most restrictive. "Yes Lists" require the teachers to research the Internet for materials they wish students to have access to, then submit the list of suitable materials to an administrator. The administrator then unblocks these sites for students access, leaving all non-approved sites fully blocked and non-accessible.

The final method of managing inappropriate material is "Content Filtering". This involves scanning the actual materials (not the URL) inbound to a network from the Internet. Word lists and phrase pattern matching techniques are used to determine if the material is inappropriate or not. This process requires a great deal of computer processor time and power, slowing down Internet access and also making this a very expensive alternative. Furthermore, it is easily defeated by pictures, Java, or some other method of presenting words/content without the actual use of fonts.

These and other drawbacks exist.

SUMMARY OF THE INVENTION

An object of the invention is to overcome these and other drawbacks in existing devices.

It is an object of the present invention to circumvent the current lack of administrative intervention by notifying a system administrator when a user repeatedly attempts to bypass security measures that have been placed to restrict viewing of inappropriate material.

It is another object of the present invention to provide a system and method of adaptively building a list of inappropriate materials so that, for example, newer websites containing inappropriate materials may be added to a filter list of websites containing inappropriate material.

It is another object of the present invention to provide a system and method of adaptively building a list of inappropriate materials by scanning local memory of network interfacing hardware such as the cache of a proxy server or the storage space of a firewall system.

According to one embodiment, a method for determining undesirable content on a public computer network is disclosed. The method operates in conjunction with a system for accessing content from the network. The system includes at least one computer and an interface for facilitating communication between the computer and the network. The interface includes local storage. The method scans the local storage of the interface for undesirable content. The scanning utilizes methods such as word, phrase and pattern matching to identify inappropriate content. After scanning, the method determines the location of undesirable content within the public computer network. For example, the network can identify the URL at which the inappropriate content is located. This is also done from local memory. These identified locations may then be added to a filter list to prevent other users from accessing the inappropriate content.

According to another embodiment, a system for determining undesirable content on a network is disclosed. The system includes at least one computer, an interface for facilitating communication between the computer and the network. The interface includes local storage e.g., for storing accessed content. The system also includes a means for scanning the local storage of the interface for undesirable content and means for determining the location of undesirable content within the network. Finally, the system also includes a filter list to which the identified sites are added.

Other features and advantages of the present invention will be apparent to one of ordinary skill in the art upon reviewing the detailed description of the present invention and the attached drawings.

BRIEF DESCRIPTION OF THE DRAWINGS

FIG. 14 is the Filter Hit Summary sorted by user IP address, which should indicate the location of the machine on the network.

FIG. 15 is the Filter Hit Summary sorted by the total number of hits per user per date-hour.

FIG. 16 is the Zoom Proxy Log which shows the actual activity on the Internet of the selected user FIG. 17 shows the client IP in the Zoom Proxy Log by displaying the user name if Microsoft Windows NT is used to authenicate security on the network.

DETAILED DESCRIPTION OF THE PREFERRED EMBODIMENTS

Figure 2:
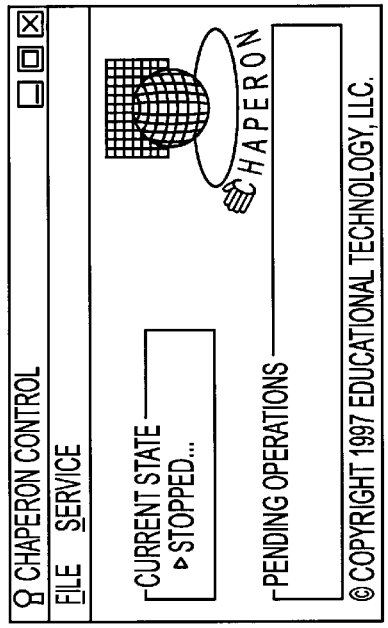
FIG. 2 is an illustration of the invention's control panel that displays the current state of the service.

A local area network (LAN) is usually a private group of computers on the same campus or property, sharing a common communication connection. The LAN, or private network, may also be connected to a wide area network (or WAN) such as the Internet. If a LAN is connected to a public network such as the Internet, it is generally desirable to have some interfacing system between the LAN and the public network. This interfacing system might comprise a proxy server or a firewall. Other interfacing systems are also possible.

Proxy servers and firewalls split computer networks into two distinct segments. One secure segment consists of a private computer network. The second segment consists of a group of computers outside the private network, e.g., a WAN such as the Internet. The only route from the secure network segment to the insecure segment is through the firewall or proxy server. The firewall or proxy server may be connected to both segments simultaneously.

More specifically, a firewall is software, hardware, or a combination of the two that is designed to keep intruders (e.g., hackers) from accessing information on a private network that they are not authorized to access and to keep users of the private network from accessing inappropriate content on outside public networks. Intruders generally try to gain access to the private network via the private network's Internet connection or by dialing into the private network via modems.

A proxy server is generally a hardware interface between a private network and a public network. A proxy server performs the same function as a firewall, as well as a number of additional functions. In addition to acting as a firewall, a proxy server can:

1. generate an activity log;
2. act as an agent for all clients on a network, to the Internet;

3. Allow private I/P addresses to be used on a network to identify client machines and thus, reduce the administrative effort needed to manage and register public I/P addresses and enhance the firewall; and, 4. cache Internet activity and thereby improve the efficiency of data acquisition from the Internet.

Some firewalls may have some of these capabilities (such as caching internet activity) as well.

According to one aspect, the present invention is designed to protect an entire computer network. More specifically, the present invention is designed to protect the users of a private computer network from exposure to inappropriate content on public computer networks by using a filter list, and more importantly, by notifying an administrator of attempts to circumvent the filter list. According to one embodiment, the present invention comprises software that is used in conjunction with an interface between a private computer network and the Internet. This interface may comprise a proxy server, a fire wall or any other network interfacing hardware. The requirements of the interface depend on the number of users in the system. A system with only a few hundred users will have different requirements than a system with thousands of users.

Figure 1:
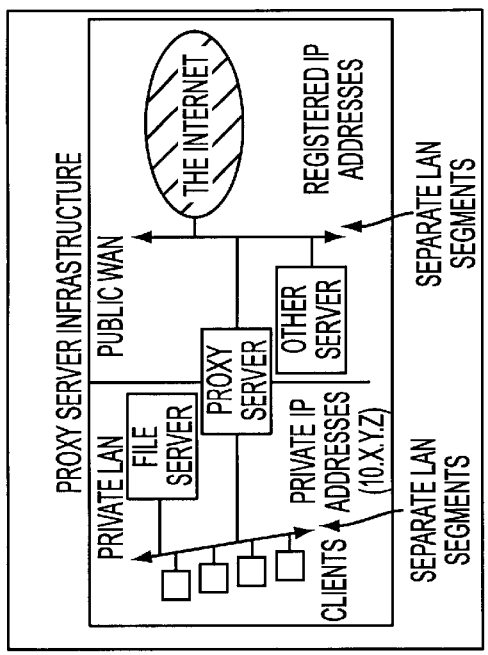
FIG. 1 is an illustration of a Proxy Server Infrastructure.

One embodiment of the present invention is shown in FIG. 1. FIG. 1 depicts a computer system containing both private and public components. The private component, may comprise a file server and a number of clients on separate LAN segments. The public component may comprise a public WAN that includes the Internet and a number of LAN segments. The public component may also include one or more servers. The private and public components are separated by a proxy server configured according to the present invention.

According to one particular embodiment, the present invention comprises software that uses an activity log generated by a proxy server (such as is shown in FIG. 1) or firewall system. The software compiles, among other things, a statistical analysis of an activity log to alert administrators of attempts to circumnavigate a filter list.

According to one embodiment, the present invention runs on Microsoft Windows NT 4.0 or greater and requires Microsoft Proxy Server 2.0 or greater to operate. The present invention can also be implemented on other suitably equipped operating systems and proxy servers, such as operating systems that generate a log of network activity. The present invention does not affect network operation other than the material it prevents from being accessed. It utilizes email and popup windows as a means of notification, with other methods such as pager notification and telephone notification also being feasible. According to one embodiment, the present invention comprises Chaperon® offered by Educational Technologies, L.L.C.

A primary philosophy of the current invention is to involve the educator in managing appropriate material in the classroom. The present invention is designed in two modules. According to one embodiment, module 1 provides notification of possible activity in fringe areas of inappropriate material (e.g., by attempting to bypass the filter list) and module 2 provides the investigation tools for personnel to research exactly what activity has transpired on their Internet connection, thus allowing appropriate action on the educator's part.

Module 1 Description

As mentioned above, according to one embodiment, the first module provides a notification function to a system administrator and thus involves the administrator in the information access process. According to one embodiment, this module of the present invention performs various operations on a log file generated by a proxy server, at predetermined intervals. This module is approximately a 5-megabyte download to the client and provides the notifications and blocking features. According to one particular embodiment, the first module is a program that runs on Windows NT 4.0 or greater, and the proxy server is Microsoft Proxy Server 2.0 or greater. More particularly, module 1 is written in Visual Basic and runs as a service on Windows NT 4.0 or greater so it can run in the background and minimize the computer resources required for operation. As explained above, the proxy server is placed in a physical location on the network to be protected, so it can isolate the network from the public Internet (See FIG. 1). According to other embodiments, the present invention could be used in conjunction with other operating systems and network interfaces.

According to one embodiment, module 1 operates using the proxy server log in a preset window of time. This time window is defined by the administrator and is referred to as the "scan interval" (see FIG. 10). The administrator should define this window to coincide with the expected length of an Internet session by the average user. A typical time window for K-12 schools is 15 minutes.

Notification Triggers

Figure 10:
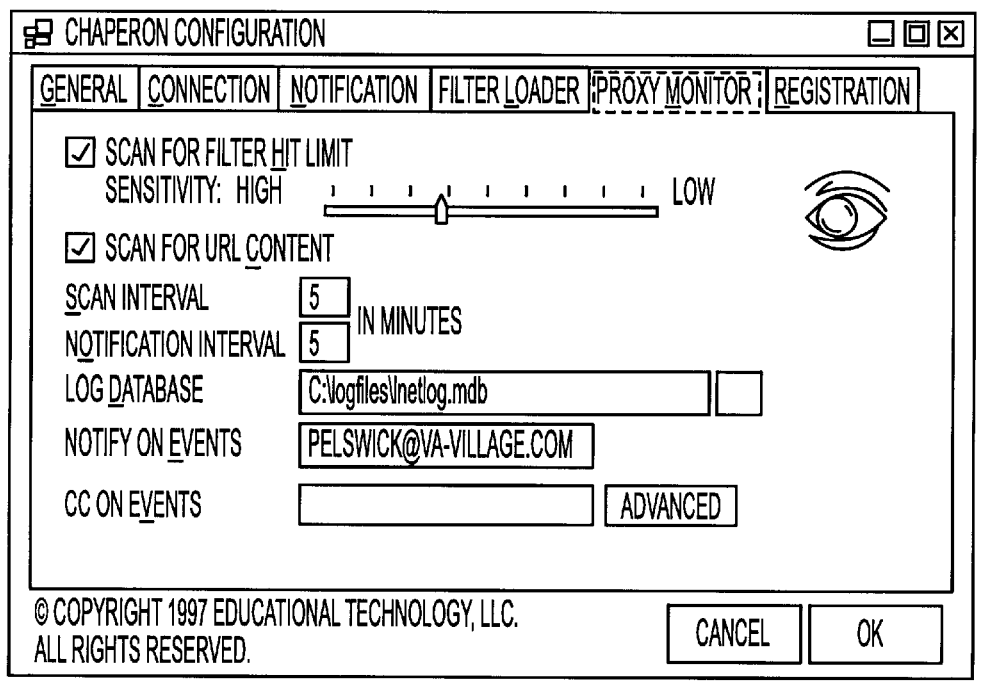
FIG. 10 is an illustration of the proxy monitor tab which displays configuration information about the monitoring functions of the proxy monitor.

Another time window exists and is called the "notification interval." The notification interval is also set by the administrator (see FIG. 10). If the notification interval is set to a time less than the scan interval, all actions herein described that take place at the end of the scan interval, with the exception of resetting the base time marker, happen at the end of the notification interval. Because the base time marker does not reset at the end of the notification interval, data is reconsidered during the next notification interval. Thus, if the notification interval is less than the scan interval, duplicate notifications may occur.

According to one embodiment, at the end of the scan interval, module 1 adds the number of attempts to access blocked material, by a user, to a running total of attempts carried since the totals were reset. Module 1 also increments a running total of filter hits for each user. Module 1 then calculates a running average by dividing the total number of filter hits by the total number of users. This is the average hits per user. As each users statistics are added to the totals used to compute the running average, the number of hits for that user is compared to the running average computed at the end of the last scan interval.

If the user's total filter hits exceed a predefined threshold, a notification is generated and stored. The administrator, using the slide feature on the configuration menu sets this threshold factor (see FIG. 10). According to one embodiment, a sensitivity setting of "High" sets the threshold factor so low that any filter hit will generate a notification of an inappropriate site access attempt. A sensitivity setting of "Low" would require the number of hits by one user to be around 4000% of the average. The default setting at program startup for the threshold factor is approximately 400%. The stored notifications are broadcast at the end of each notification period.

This averaging method is not the only method of triggering a notification message. According to another embodiment, a true standard deviation calculation is used with the predetermined threshold being a standard deviation figure. According to this embodiment, the present invention is implemented using Microsoft SQL Server or similar database engine. These type of programs permit making a query within a query—a prerequisite for calculating a standard deviation. Some programs such as Microsoft Access database do not permit a query within a query. Thus, a running standard deviation cannot be used in conjunction with these systems.

When the program is beginning with very few users, a small number of filter hits, or a near zero running average the above algorithm could be unreliable. According to one embodiment, to compensate for this potential difficulty, the number of hits per minute (hits/minute versus hits/user) is used as the trigger for notification. According to this embodiment, the slider bar shown in FIG. 10 is used to specify a number of hits per minute. Because the number of filter hits per minute is set by the same slider bar, the number of filter hits to trigger a notification will be in proportion to the percentage multiple that the slider sets for the averaging method. The program takes the number of filter hits per client for the scan interval and divides it by the number of minutes in the scan interval to get a number of hits per minute per client. If this hit rate is higher than the slider bar value, a notification is sent. This message generation technique is useful when the program first starts and has yet to determine an average baseline. At the default setting, the slider bar value would be approximately 4 hits per minute. This is high enough to prevent accidentally triggering on anyone but the most determined user (i.e. For a 15 minute scan interval, it takes 60 filter hits to trigger a notification, this large of a number would be unheard of for inadvertent hits). According to one embodiment, the program flushes the baseline average at about 1:00 am. In most school settings, anyone using the computer during this time frame would be one of a very few users (hence the averaging method wouldn't work anyway) and very likely is a user determined to find inappropriate material anyway. As experience is gained, the trigger methods can be adjusted to compensate for the improvement in the understanding of the problem.

According to another embodiment, URL scanning is used to initiate a notification message. URL scanning looks for keywords, phrases and uses pattern recognition within the URL as it is handled by the proxy server. Keyword and phrase recognition is used to detect the search terms in the log on a 3-second timer cycle. If a match is detected, a notification is generated and stored. An example of this is the following Yahoo search request:

http://search.yahoo.com/bin/search?p=naked+women

According to one embodiment, a keyword search would identify the words "naked" and "women" and trigger a notification. According to another embodiment, a keyword search would identify the word "naked" and trigger a notification.

Pattern recognition is also used to determine when the user has entered an index of one of the major search engines that catalogs inappropriate material. According to one embodiment, this is also done on a 3-second timer. If a match is detected, a notification is generated and stored. For example, the following URL would trigger a notification by looking for the pattern found in the URL beginning with "yahoo" and ending with "sex":

http://www.yahoo.com/Business_and_Economy/Companies/Sex/Virtual_Clubs/

According to one embodiment, notifications are stored and broadcast on a 15-second time period.

Notification Methods

The notifications that are initiated by the above trigger methods may comprise e-mail notifications, pop-up notifications, and paging notifications. Other methods of notifications are possible. According to one embodiment, when notifications are triggered, they are stored until the notification interval is complete, with the exception of notifications that are triggered by URL scanning. According to a particular embodiment, filter hits exceeding the threshold limit notifications are broadcast at the end of each notification interval. Notifications generated by URL scanning are broadcast every 15 seconds. At those times the stored notifications are executed and deleted and the next notification interval begins.

The length of the notification interval is set by the administrator on the Proxy Monitor panel as illustrated in FIG. 10. The administrator can configure various notification structures. According to one embodiment, the "Notify on Events" and "CC on Events" fields are used when email notification is desired, to specify what email addresses an email is sent to in the event a notification message is triggered anywhere in the protected network. According to another embodiment, the advanced settings panel is used to specify email and popup notifications by I/P address netmasks, using global characters. This feature is useful if an administrator is distributing the administrative duties to various people at different locations on the network.

Operation

One embodiment of a control panel for the present invention is shown in FIG. 2. The control panel displays the Current State of the service. This includes stopped, running, stopping, and starting. The control panel also displays any Pending Operations. According to one embodiment, any commands that have been requested and are awaiting their turn to execute are displayed under Pending Operations.

Figure 3:
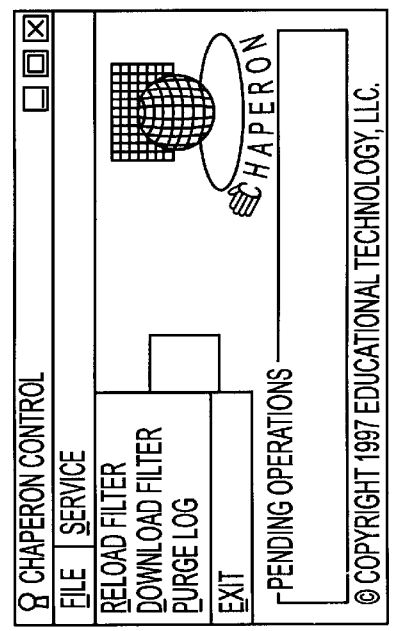
FIG. 3 is an illustration of the file dropdown menu in the control panel.
Figure 9:
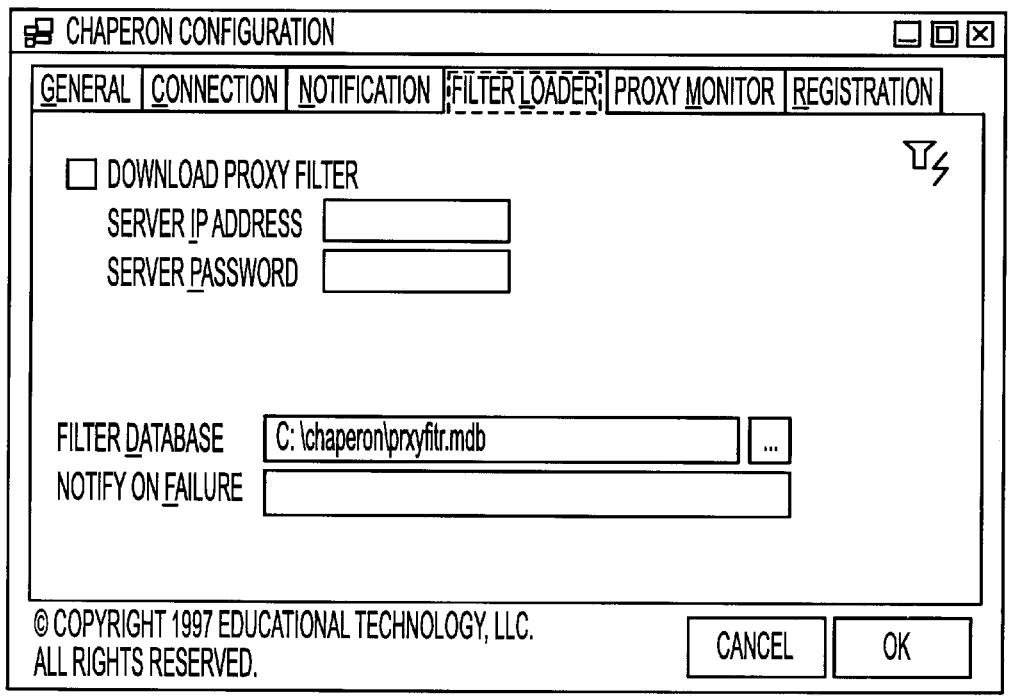
FIG. 9 is an illustration of the filter loader tab which specifies information about where to obtain filters.

FIG. 3 illustrates a File dropdown menu according to one embodiment of the present invention. Options include Reload Filter, Download Filter, and Purge Log. In the event that a manual update of the filter list is desired, the administrator will select the Download Filter command. According to one embodiment, the program accesses a predefined web server (See FIG. 9) and downloads the latest filter list. According to one embodiment, in normal operation, this is done automatically and daily. Once the download is completed, the Reload Filter command is selected. This will stop the service on Microsoft Windows NT, merge the new filter list with the local exception list, reload the filter list into the proxy server registry, and restart the service on Microsoft Windows NT.

Ocasionally, the Proxy Server log file will become too large for the hardware components to handle. This could result from too long of a history being specified on the Configuration/General tab (See FIG. 6). This would result in a proxy log file that is too large for the hardware platform to manipulate. The Purge Log command can be used to reduce the size of this file. The Purge Log command will stop the service on Microsoft Windows NT, reduce the size of the proxy log file to the number of days specified on the Configuration/Proxy Monitor tab, and restart the Microsoft Windows NT service.

Figure 4:
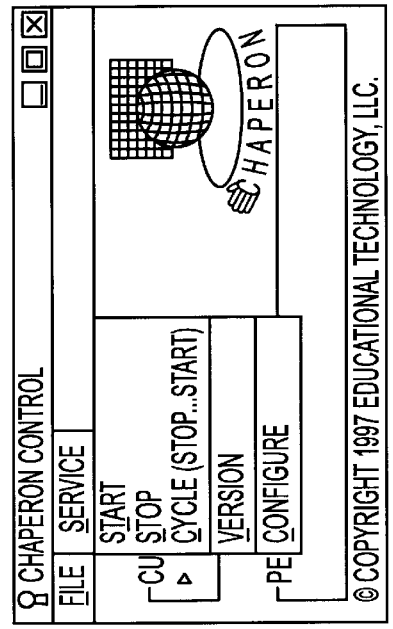
FIG. 4 is an illustration of the Service dropdown menu in the control panel.

According to one embodiment, the present invention's Service dropdown menu (See FIG. 4) includes the manual Start, manual Stop, the Cycle command (which is an automatic Stop and Restrart sequence), Version information, and Configure tab dialog box.

The manual Start and Stop commands, start and stop the service on the Microsoft Windows NT server, respectfully. Whenever any configuration changes are made, the service on Microsoft Windows NT has to be stopped and started to make those changes effective. To facilitate this, the Cycle command should be used. It will automatically stop and restart the service to activate configuration changes.

Figure 5:
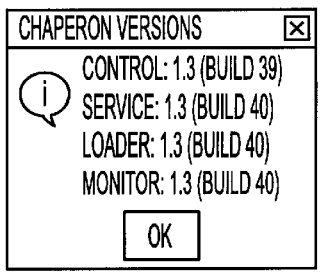
FIG. 5 is an illustration of the version command screen that displays the software version and build numbers.

The Version command will activate a screen (See FIG. 5) that displays the software version and build identification numbers.

Figure 6:
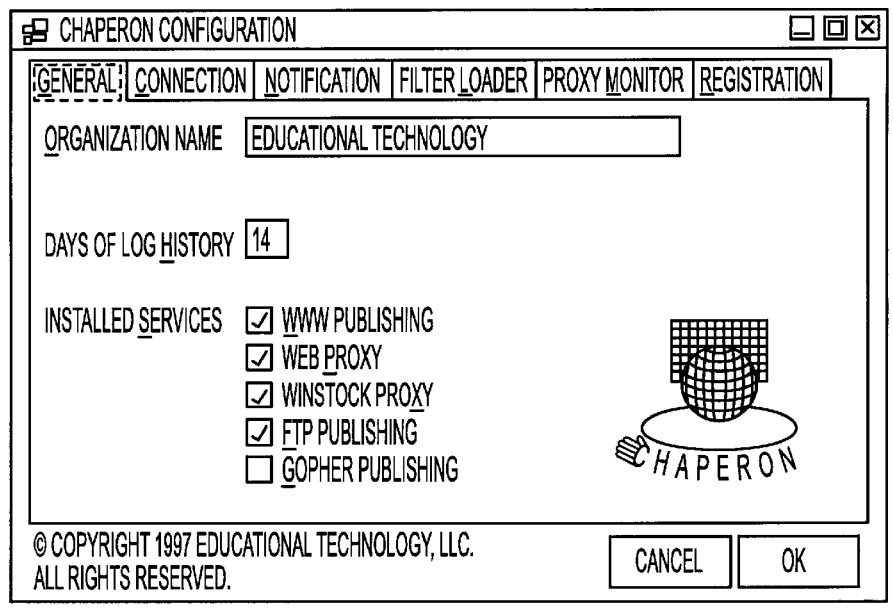
FIG. 6 is an illustration of the configuration tab dialog box that includes the general, connection, notification, filter loader, proxy monitor, and registration tabs.

The present invention's Configuration command displays a Tab Dialog Box (See FIG. 6). There are six tabs, labeled general, connection, notification, filter loader, proxy monitor, and registration. The General tab records the organization name, how many days of the proxy log is kept before purging. It also defines what services are installed on the proxy server. This tab also contains a password entry field and a password verification field. If entries are made into these fields, the ability to reconfigure Chaperon becomes password protected, if left empty, the configuration menus are not protected.

Figure 7:
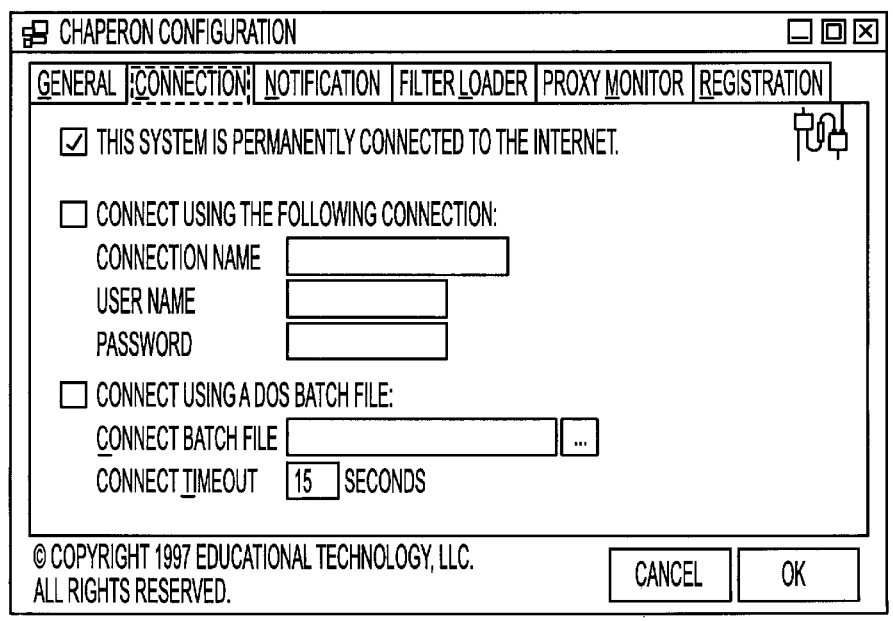
FIG. 7 is an illustration of the connection tab that defines what type of connection the proxy server is using to connect to the Internet.

FIG. 7 illustrates the Connection tab. According to one embodiment, the Connection tab defines what type of connection the proxy server is using to connect to the Internet. This information is needed when the download of the revised filter list is initiated nightly. Three methods of connection can be defined; a permanent connection, dial-up connection using Remote Access Service, or dial-up using a batch file. When the program determines it is time to connect to the Internet, it notifies the proxy server to establish a connection via the appropriate method.

Figure 8:
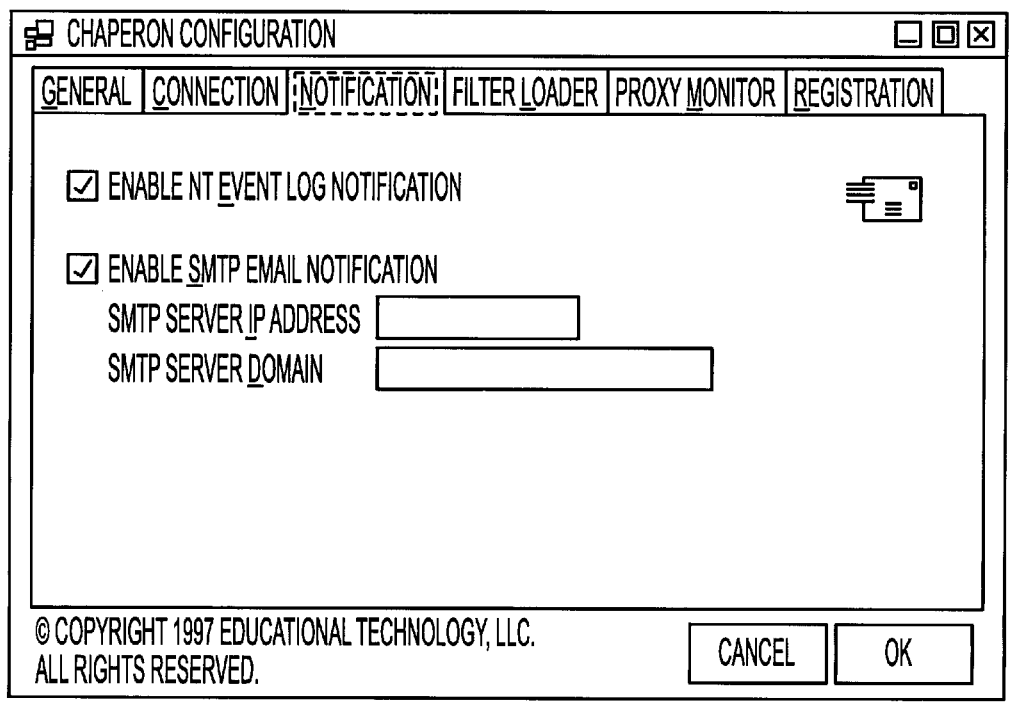
FIG. 8 is an illustration of the notification tab whose function is to set up the invention's notification feature.

The Notification tab (See FIG. 8) sets up the notification feature. NT event log notification can be enabled or disabled on this menu. Email notification can also be enabled and disabled here. If email notification is enabled, a SMTP server IP address and SMTP server domain must be specified.

The Filter Loader tab (See FIG. 9) specifies information about where to obtain a revised filter, where it is located on the local machine, and who to notify if the automated filter download fails. According to one embodiment, the nightly download feature can be enabled or disabled on this menu. The server's IP address that has the filter list to be downloaded and the required password is defined on this menu. If the filter list download fails, the email address of the person to be notified is also stored here.

Figure 11:
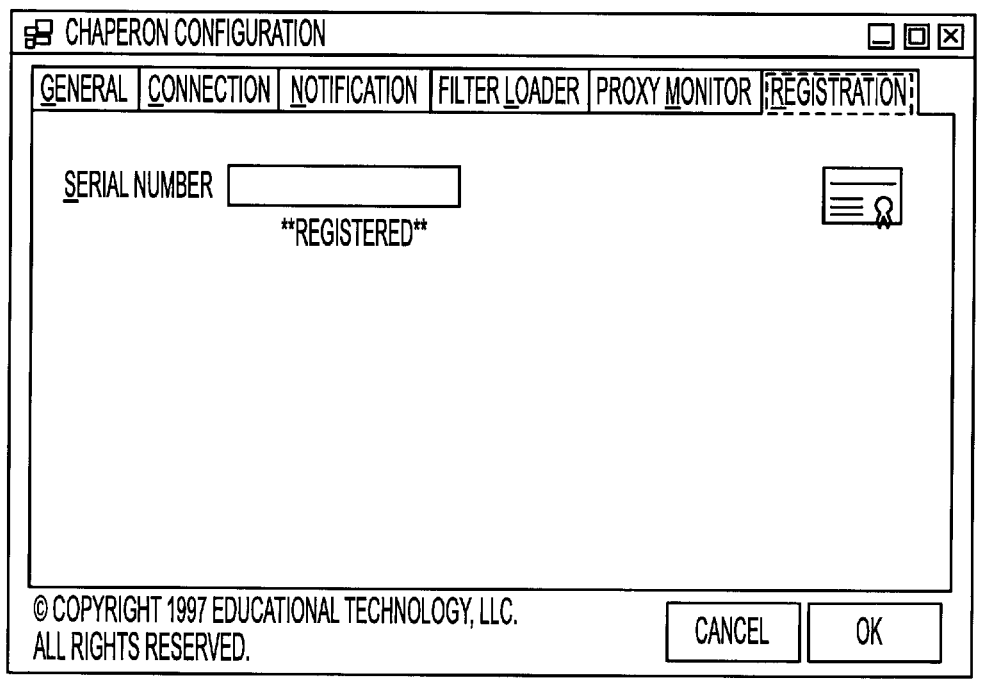
FIG. 11 is an illustration of the registration tab which displays the product serial number and designates proper ownership.

The Registration tab (See FIG. 11) displays the product serial number. According to one embodiment, an acknowledgement of proper product registration is displayed here.

Figures 12, 13:
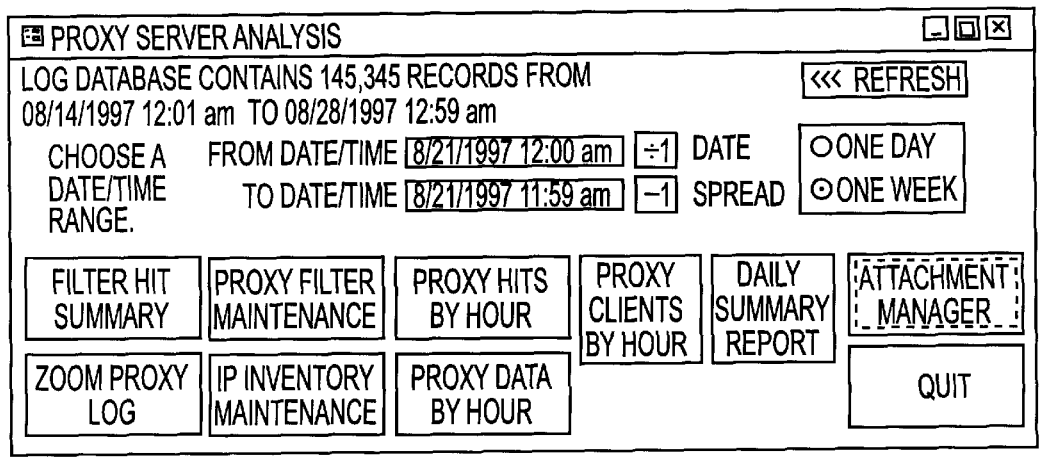
FIG. 12 is the Proxy Server Analysis menu of module 2
FIG. 13 is initial Filter Hit Summary display that shows the number of filter hits per client, per date-hour.

FIG. 12 is the Proxy Server Analysis menu of module 2. Starting at the top left hand side of the menu, the number of records contained in the current log file and the start and end date/time is displayed. According to one embodiment, the log is continually recording Internet activity and the administrator can select the REFRESH button at the upper right side of the menu to get the latest statistics displayed on the menu.

Just below the REFRESH button the administrator can select what time period they wish to investigate. This DATE SPREAD can be either a single day or week. Other time periods are possible. To the left of the DATE SPREAD are the fields that indicate the exact starting date/time to be selected. The +1 and −1 keys allow the time period to be moved in either one day or one-week increments, forward or backward.

Below the date/time range controls are six buttons that activate various functions. These include FILTER HIT SUMMARY, PROXY FILTER MAINTENANCE, PROXY HITS BY THE HOUR graph, PROXY CLIENTS BY THE HOUR graph, DAILY SUMMARY REPORT, and the ATTACHMENT MANAGER. Further down are four more buttons, including ZOOM PROXY LOG utility, IP INVENTORY MAINTENANCE, PROXY DATA BY THE HOUR graph, and the QUIT buttons.

The initial Filter Hit Summary display is shown in FIG. 13. According to one embodiment, the display shows the number of filter hits per client, per date-hour. The filter hit summary display has three columns. The first column is the date-hour. The second column is the Client IP Address. This is the IP address of the user's computer. The last column is the total number of filter Hits per date-hour. The data in this display can be sorted by clicking on the column headings, as illustrated in FIG. 14 and 15.

FIG. 14 shows a display sorted by user IP address, which should indicate the location of the machine on the network. FIG. 15 shows a display that is sorted by the total number of hits per user per date-hour. This display is very helpful even without the notification feature of module 1. These displays make it is obvious which users have hit the filter list with a disproportionate frequency. According to the inappropriate site management philosophy of the present invention, this is a primary indicator of deliberate inappropriate site access.

By clicking on the arrow button coinciding with the user the administrator would like to investigate, to the right of the filter Hits column, the Zoom Proxy Log display appears (See FIG. 16). This display shows the actual activity on the Internet of the selected user. The time frame displayed is determined by the time of the first filter hit during the selected Date/Time minus the Zoom Time in Minutes to the last filter hit of the selected Date/Time plus the Zoom Time in Minutes. By clicking on the column heading Client IP, the user name will appear if Microsoft Windows NT is used to authenicate security on the network (See FIG. 17). If another security authentication or no security is used, the IP address of the user's machine will appear. The IP Inventory Maintenance feature is used to translate these IP addresses to usable names or locations in the event that Microsoft Windows NT security is not implemented. If no security is used or another security other than Microsoft NT is used, static IP addresses or long term leasing of DHCP addresses are used in order for the network to facilitate locating incidents.

The status column displays whether the site was viewed by the user or blocked from viewing (See FIG. 16). The red Block x and the green Unblock checkmark allow sites that are not blocked to be added to the filter list or in the case of Unblock, to release a site for viewing. These changes are local in nature and do not affect the master filter list for other subscribers.

Figures 18, 19:
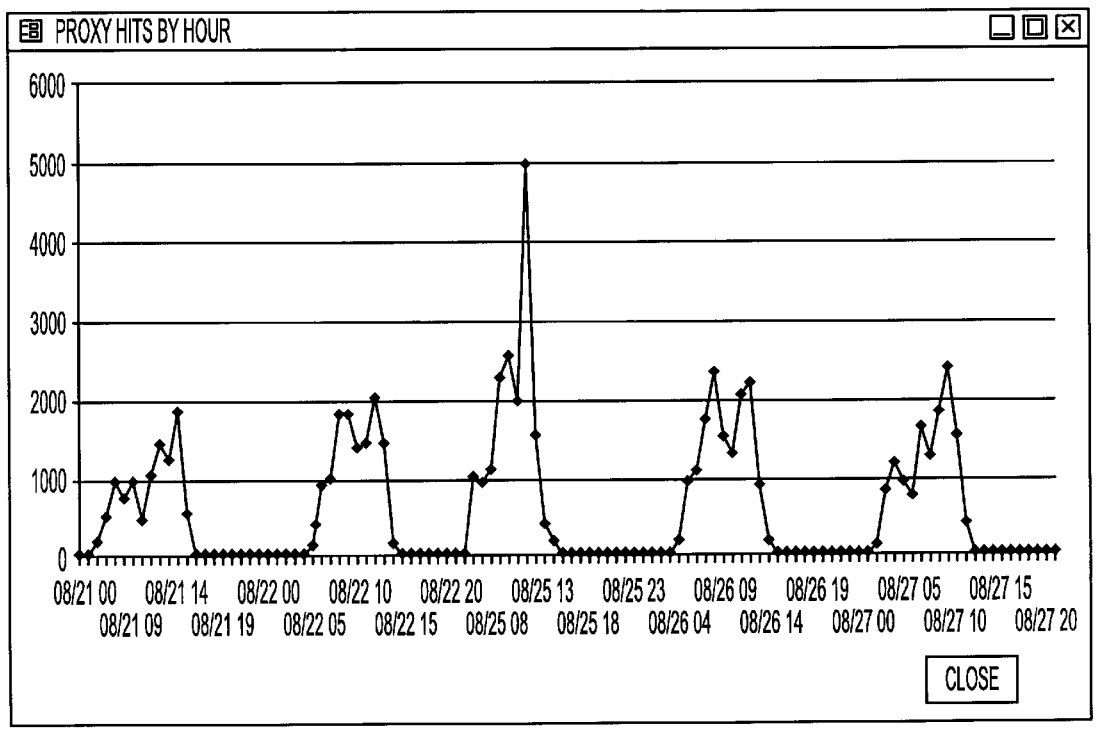
FIG. 18 is the PROXY FILTER MAINTENANCE display which allows the user to define domains or IP addresses that they wish to either block or display.
FIG. 19 is the PROXY HITS BY THE HOUR graph which displays the number of web pages successfully accessed by the proxy server.

The PROXY FILTER MAINTENANCE (See FIG. 18) display allows the user to define domains or IP addresses that they wish to either block or display, overriding the master filter list distributed by the vendor. According to one embodiment, it is important to note that these override settings do not take effect until the filter list is reloaded.

According to one embodiment, the PROXY HITS BY THE HOUR graph (See FIG. 19) displays the number of web pages successfully obtained in thousands by the proxy server versus the Date/Hour.

Figure 20:
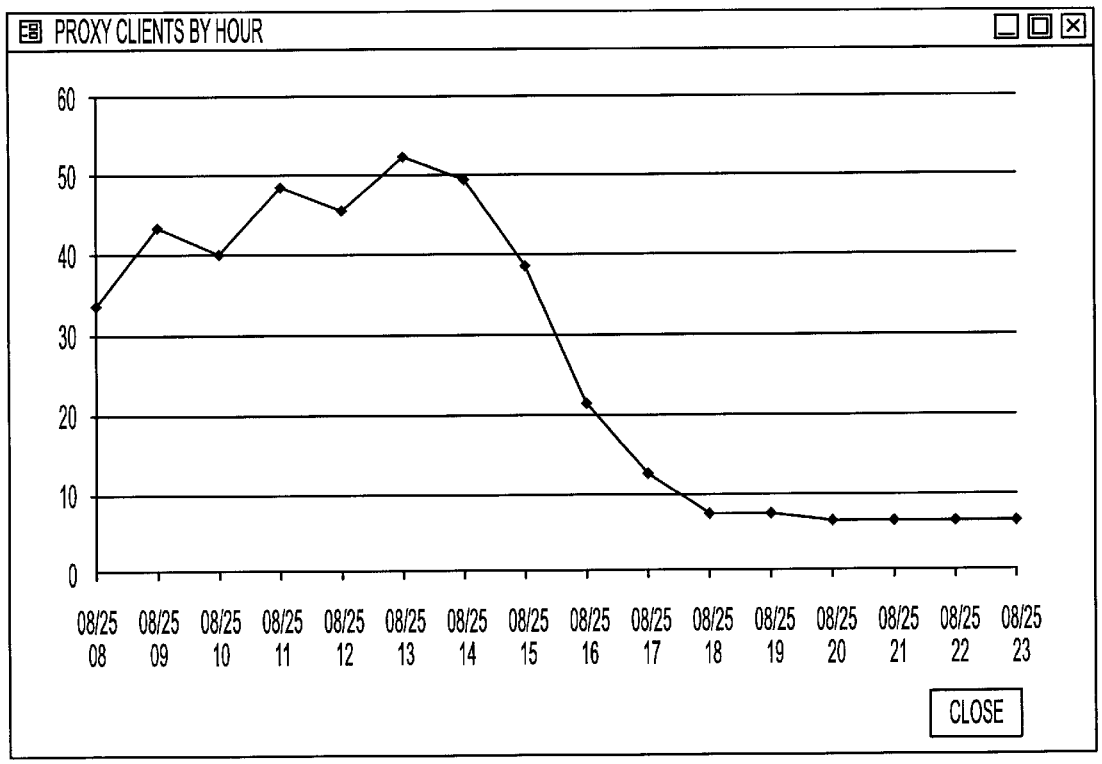
FIG. 20 is the PROXY CLIENTS BY THE HOUR graph which displays the number of users using the proxy server.

According to one embodiment, the PROXY CLIENTS BY THE HOUR graph (See FIG. 20) displays the number of users using the proxy server versus the Date/Hour.

The Daily Summary Report details the Proxy Server Usage Statistics. These include; Total Hits by All Clients, Hits Serviced by Proxy Cache, Proxy Filter Hits, Unique Sites Visited, Unique Client Machines Using Proxy, Total Bytes Received Through Proxy, and The Top 15 Sites Visited During the Period.

Figure 21:
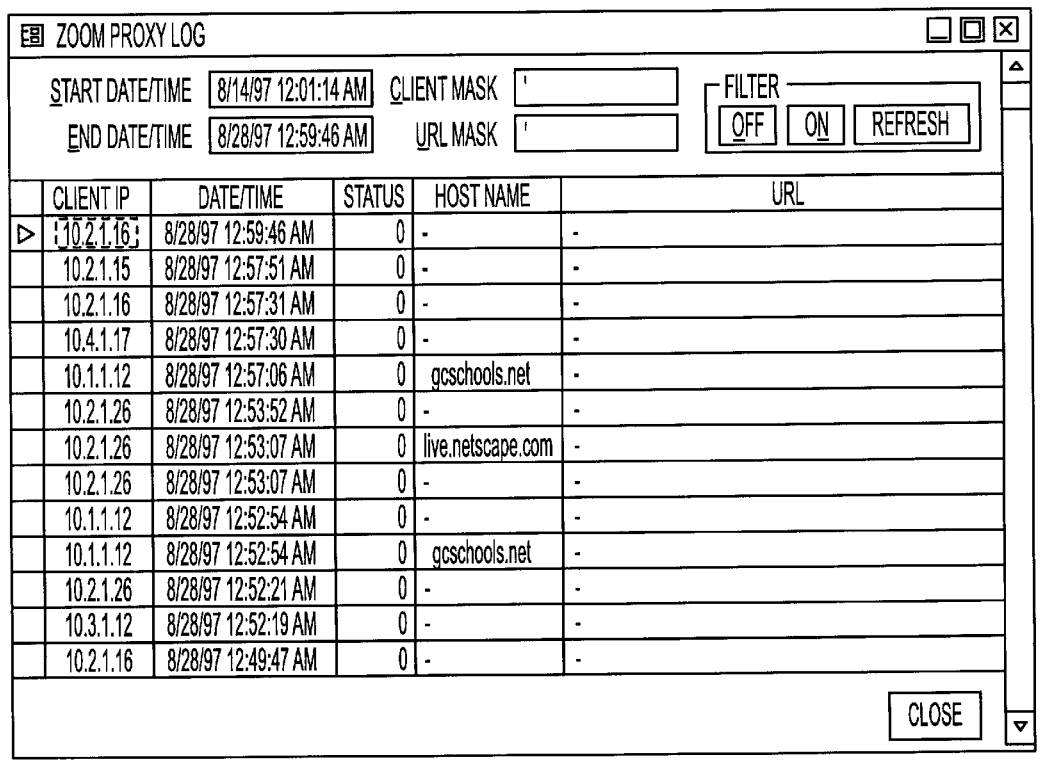
FIG. 21 is the ZOOM PROXY LOG button which displays the menu used to generally investigate the proxy filter log.

The ZOOM PROXY LOG button (See FIG. 21) is used to display the menu used to generally investigate the proxy filter log. According to one embodiment, the Start Date/Time and the End Date/Time automatically default from the Proxy Server Analysis menu (FIG. 12). The Client MASK is used to filter for a certain IP address or range of addresses.

Wildcard characters (*,?) can be used in this field to facilitate this. The URL MASK is used to filter URL information in the same manner as the Client ASK is used. In both cases, the Filter must be turned on using the On button to the left of the Refresh button. Once the criteria are selected, the Refresh button must be clicked to refresh the content in the display.

Figures 22, 23:
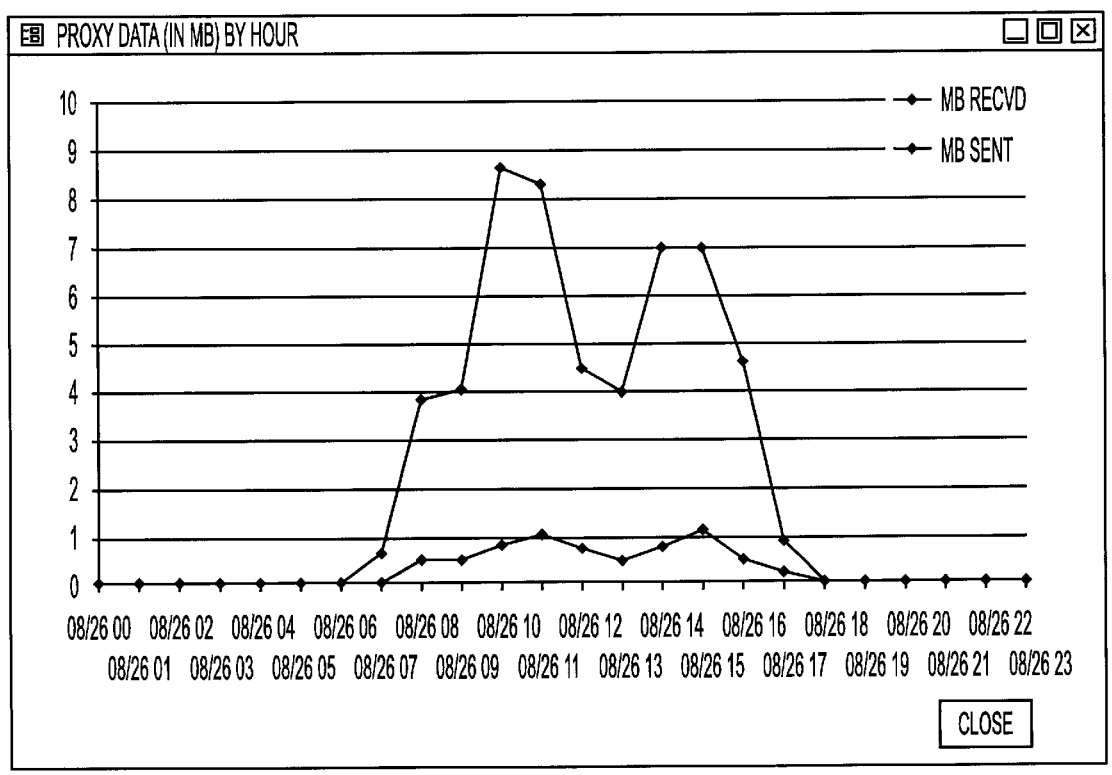
FIG. 22 is the IP INVENTORY MAINTENANCE function which is used to catalog specific IP addresses with the location of individual machines on the network.
FIG. 23 is the PROXY DATA BY THE HOUR graph which displays the number of megabytes of data sent and received by the proxy server.

The IP INVENTORY MAINTENANCE function (FIG. 22) is used to catalog specific IP addresses with the location of individual machines on the network. This database is used by the Zoom Proxy Log display (See FIG. 17) to display the machine identification rather than the IP address of a user being researched. The IP address, machine name, location, normal user, and comments can be entered into this database.

The IP inventory is only necessary when static IP addresses or long term leased DHCP IP addressing is used. In the case of Microsoft Windows NT authenticating security on user names and passwords, this database is unnecessary. The use of Microsoft Windows NT security as a primary domain controller (PDC) allows the username to be displayed on the Zoom Proxy Log display.

The PROXY DATA BY THE HOUR graph (FIG. 23) displays the number of megabytes of data sent and received by the proxy server versus Date/Time. These numbers do not reflect the data responded to by the cache, therefore, total data transfer for the system cannot be determined with this graph, only actual data transmitted or received from the Internet Service Provider.

The QUIT button closes module 2, the Proxy Server Analysis application.

Module 2 Description

The primary philosophy of the current invention is to involve the educator in managing appropriate material in the classroom. To that end, the above described module 1 provides notification of possible activity in fringe areas of inappropriate material. Module 2, explained below, provides the investigative tools for personnel to research exactly what activity has transpired on their Internet connection, thus allowing appropriate action on the educator's part.

The purpose of module 2 is to query the proxy server log file and information about the Internet activity of the users in a useful manner to educators. According to one embodiment, module 2 is a Microsoft Access 97 application. Other implementations are possible.

The system uses a "Filter List" as its foundation. In general, filter lists are designed to filter obviously offensive material and therefore can be easily circumvented. The filter list is inclusive enough that it will most likely block attempts by the inadvertent user to access inappropriate material, however, focused attempts by a determined user to get through any filter list will inevitably succeed. The present invention deals with this shortcoming by having the ability to notify persons in authority when there are deliberate attempts to get past the filter list. As explained above, these notifications take the form of e-mail or pop-up windows/messages at the administrator's work station. According to one embodiment, the notifications are triggered by a statistical analysis. The theory of using statistical analysis relies on the assumption that, on average, each proxy user will hit the filter from time to time and that a user who is actively seeking inappropriate material will hit the filter a disproportionately larger number of times relative to the average user.

Average Hits/User Algorithm

The proxy server records in a log file each access made by a proxy server user. The present invention inspects a number of these proxy server activity log records picked from a time frame determined by the system administrator. For example, if the system administrator defines the time frame as 15 minutes, the method and system of the present invention inspect a selection of records representing 15 minutes of proxy server activity. The number of times each proxy user was denied access to any site (a filter hit), is then totaled. The total number of users is then divided into the total filter hits for the time period and an average hits/user is determined. The present invention then calculates the average numbers of hits per user and triggers a notification if a single user exceeds this figure by a predetermined multiplier as set by the slider bar.

Average Hits/Minute Algorithm

As explained above, when the use of the program is just beginning with very few users, a small number of filter hits, or a near zero running average the above algorithm could be unreliable. Therefore another trigger for a notification message is to use the slider bar value to specify a number of hits per minute. Because the number of filter hits per minute would be set by the same slider bar (See FIG. 10), the number of filter hits to trigger a notification will be in proportion to the percentage multiple that the slider sets for the averaging method. The program takes the number of filter hits per client for the scan interval and divides it by the number of minutes in the scan interval to get a number of hits per minute per client. If this hit rate is higher than the slider bar value, a notification is sent. This message generation technique is useful when the program first starts and has yet to determine an average baseline. At the default setting, the slider bar value would be approximately 4 hits per minute. This is high enough as to prevent accidentally triggering on anyone but the most determined user (i.e. For a 15 minute scan interval, it takes 60 filter hits to trigger a notification, this large of a number would be unheard of for inadvertent hits). According to one embodiment, the program flushes the baseline average at about 1:00 am. In most school settings, anyone using the computer during this time frame would be one of a very few users (hence the averaging method wouldn't work anyway) and very likely is a user determined to find inappropriate material anyway.

URL Scanning Method

In addition, each and every proxy server log record is inspected and compared against the contents of the URL with a list of words, phrases, and patterns. If the URL contains one or more of the key words or phrases or matches one of a list of specified patterns a notification is sent to the administrator. This methodology is based on the knowledge that users actively seeking inappropriate material will usually begin by using a search engine, such as Yahoo or Excite, to locate the material they are seeking. The words and phrases the user is searching for are relayed to the search engine in the URL (Uniform Resource Locator).

A notification being generated indicates up to three things to administrators: First, as discussed above, the filter is blocking an unusually large number of attempts by a single user as compared to other users. A notification could also mean that the number of filter hits/minute has exceeded a predetermined level. Finally, in the case of the URL scan notification, the administrator is being informed of a user's intention to find inappropriate material. The notifications include the offending client's location or user name/identification.

The proxy server log analysis tool (module 2) provides the system administrator with the ability to easily isolate and inspect specific proxy user's activity for a selected time frame. This tool is frequently used in conjunction with the notification messages to determine if the user is indeed actively searching for inappropriate material and the frequency and severity of the inappropriate access. Very often, because there is a high probability that inappropriate sites have been accessed that were not blocked by the filter list, the system administrator will be able to identify (and subsequently add to the filter list) additional sites which the user may have gained access to. The proxy server log analysis tool also provides graphs depicting usage of the proxy server in terms of total hits per hour, total megabytes of data (bandwidth usage) per hour, and total proxy clients per hour. Over time, with the use of the proxy server log analysis tool, system administrators are able to quickly identify unusual proxy server parameters, which may indicate an inappropriate use problem.

As previously mentioned, our software focuses on the educator being the decision-maker as to whether inappropriate material is being, or has been accessed, and if so, what actions should be taken. Since educators are in control, their professionalism and traditional democratic processes can be implemented to determine what is appropriate for the classroom. In contrast, conventional methods try to solve the problem without human intervention.

The method and system explained in FIGS. 1–23 operate in conjunction with a filter list. According to another embodiment, the present invention comprises a method and system of creating or adaptively modifying a filter list. The present invention adaptively builds a list of inappropriate sites in a number of ways. According to one embodiment, the present invention adaptively builds a list of inappropriate sites by scanning local memory of an interface to a public computer network in order to identify sites that were visited by users and that contain inappropriate content. In a particular embodiment, the interface comprises a proxy server and the local memory comprises cache. According to another embodiment, the present invention adaptively builds a list of inappropriate sites by connecting to known inappropriate sites or by joining known inappropriate chat and newsgroup channels and recording location information for sites that are linked to the know inappropriate sites.

Figure 26:
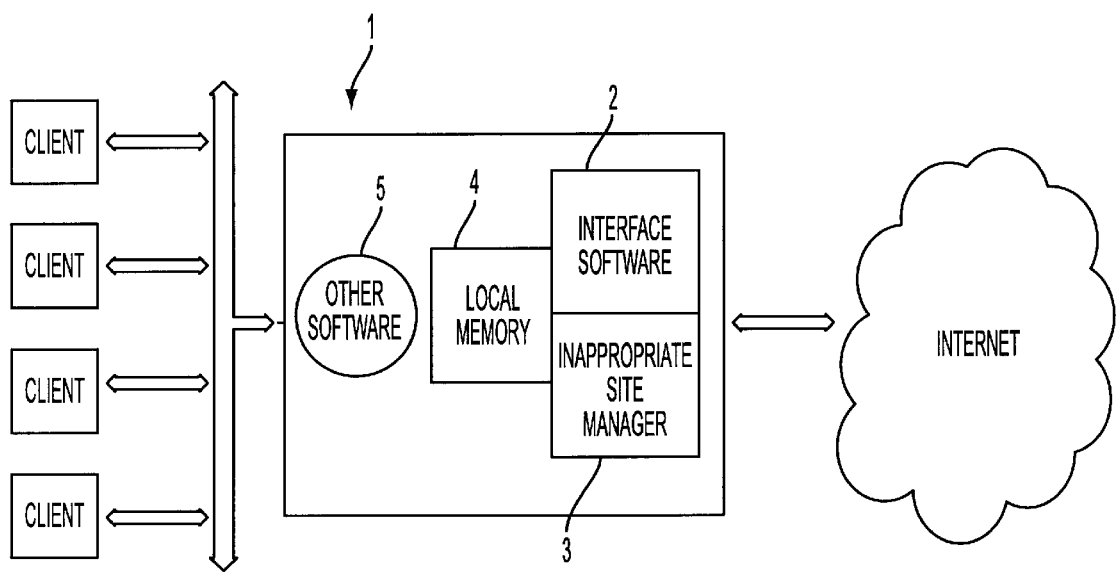
FIG. 26 is a block diagram of a system for identifying inappropriate content according to one embodiment of the present invention.

FIG. 26 is a block diagram depicting network interfacing hardware according to one embodiment of the present invention. In particular, FIG. 26 depicts an interface 1 situated between a private computer network composed of a number of clients and a public computer network such as the Internet. According to one embodiment, interface 1 comprises interface module 2, an inappropriate site management system 3, local memory 4, and other software 5. According to one particular embodiment, interface 1 comprises any hardware having the capacity to act as an agent for a number of clients. In particular, interface 1 comprises a proxy server. According to one embodiment, the proxy server may comprise e.g., Intel® or Alpha-based hardware. Interface module 2 comprises any software that utilizes interface 1 as an agent for clients on a private network and that includes the ability to cache internet activity. According to one particular embodiment, interface module 2 comprises proxy server software such as Microsoft Proxy Server 2.0 or greater. Local memory 4 comprises any memory that is capable of long term storage of information, such as static information originating from the Internet. According to one particular embodiment, local memory 4 comprises cache. Other software 5 comprise any other software that may reside on interface 1. Other software 5 may include administrative software and virus scanning software.

Inappropriate site management system 3 comprises a system that is used to manage and control content accessed from public computer networks such as the system explained in conjunction with FIGS. 1–23. The system 3 also includes the ability to create and adaptively modify a filter list by inserting new filter sites periodically or in near real-time. According to one embodiment, system 3 works in conjunction with a proxy server that serves as interface module 2 to manage and control access to inappropriate content. The system accomplishes this in a number of ways as explained below.

According to one embodiment, inappropriate site management system 3 shown in FIG. 26 can create a filter list or adaptively modify an existing filter list using local memory of interface 1. As explained above, one function of a proxy server is to store static information such as banners, menu options, etc. from websites that are accessed so that if those websites are re-accessed, the website can load faster by utilizing the information stored on local memory. According to one embodiment, system 3 of FIG. 26 creates or modifies a filter list by scanning the information stored in local memory for certain words, phrases or patterns that indicate inappropriate content and by adding the URLs for the sites at which the inappropriate content originated to a filter list. This process is explained in more detail in conjunction with FIG. 27.

Figure 27:
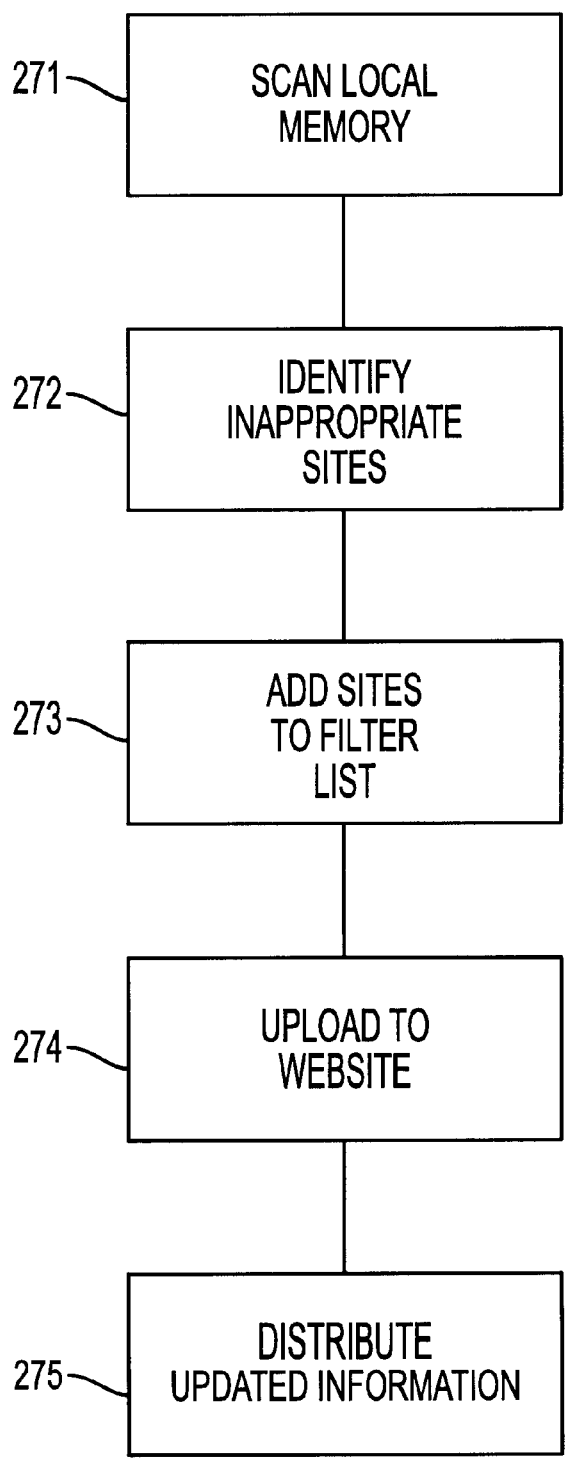
FIG. 27 is a flowchart of a method for identifying inappropriate content according to one embodiment of the present invention.

FIG. 27 is a flow chart illustrating a method of creating or modifying a filter list from local memory. In step 271, local memory is scanned to determine whether inappropriate content is present. This scanning is much like the URL scanning described above. According to one embodiment, local memory of interface 1 is scanned for the occurrence of words, phrases or patterns that indicate inappropriate content. This scanning can be done at any time so that network operations are not interrupted by the scanning, e.g., in the middle of the night.

In step 272, sites that contain inappropriate content are identified. According to one embodiment, sites that contain inappropriate content are identified by their URL. According to one particular embodiment, the URLs for sites that contain inappropriate content are found in local memory along with the inappropriate content. Thus, the URLs for sites that contain inappropriate information are identified in step 272.

In step 273, the sites are added to the filter list. According to one embodiment where the sites are identified by their URL, the URLs of the sites that contain inappropriate content are added to a filter list used by inappropriate site management system 3. According to a particular embodiment, inappropriate site management system 3 is capable of having instructions inserted "on-the-fly." According to this embodiment, URLs of sites that contain inappropriate content are inserted into the filter list as they are identified.

The steps 271–273 shown in FIG. 27 can be used locally to form a complete system and method for creating or adaptively modifying a filter list. Recognizing, however, that the identified sites are also useful to others, the system of the present invention provides a way to disseminate that information. In step 274, the URLs for sites that have been identified as containing inappropriate content are uploaded to an Internet web site. According to one embodiment, the URLs are uploaded to the web site for the company which produces the software. According to one particular embodiment, the URLs are uploaded to Educational Technologies website. According to one embodiment, this process is done during non-working hours, e.g., the middle of the night in order to avoid network delays.

In step 275, a updated filter list information is distributed. According to one embodiment, a journal system is used to distribute the updated filter list information. In particular, the interface within which inappropriate site management system 3 is running, periodically sends an update request to the website. Within the update request is a timestamp indicating the last time the filter list was updated. The website server then automatically sends additions to the filter list used by inappropriate site management system 3 that have not been previously sent. This process can take place at regular intervals or in near real-time. According to another embodiment, after receiving the updated filter list information from installations that use inappropriate site management system 3, the website compiles a revised filter list and posts it for downloading. According to another embodiment, the website compiles a list of new inappropriate sites and posts the list on its website as a supplemental filter list. This revised filter list information can be accessed by clients running inappropriate site management system 3.

The system and method explained in conjunction with FIGS. 26 and 27 enable a filter list to be adaptively modified. The system and method of FIGS. 26 and 27 also enable information to be shared among various private networks via uploading and downloading to a central site. In this way, new inappropriate sites can be identified as soon as they are accessed and incorporated into the filter list. According to another embodiment, the system and method of FIGS. 26 and 27 can be utilized in a system without an interface. In such an environment, local memory of individual computers is scanned to determine inappropriate content. This information can also be shared through a central website just as explained above. Thus a "virtual" filter list network can be created using the method and system explained above.

Figure 24:
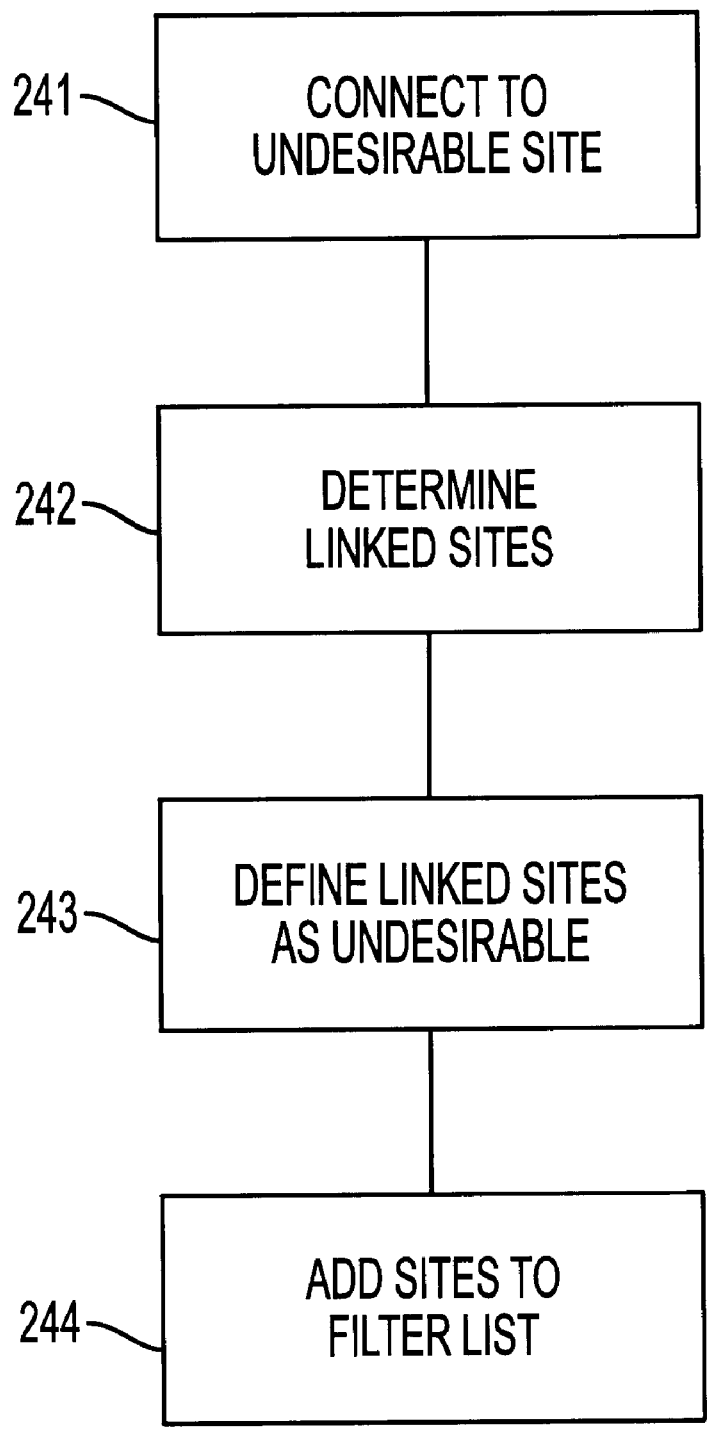
FIG. 24 is a flow chart indicating a method for creating a filter list according to one embodiment of the present invention.

FIG. 24 is a flow chart that illustrates a method of creating a filter list in conjunction with a known undesirable site. The method begins by establishing a connection to an undesirable site (step 241). According to one embodiment, the undesirable site is derived from a filter list, such as is mentioned in conjunction with FIGS. 1–23, and connected to by entering its site address (e.g., its URL). According to other embodiments, the undesirable site may be chosen and connected to in any of a number of conventional ways.

A list of sites that are linked to the undesirable site is developed in step 242. According to one embodiment, the list of linked sites is developed by scanning the undesirable site for all links and adding those links to the list. According to one embodiment, a search algorithm similar to the URL scanning method described above is used. According to this embodiment, instead of looking for undesirable words, patterns such as "http//" are searched for in order to identify all linked sites. Other methods of identifying linked sites are possible.

The determined linked sites are defined as undesirable and added to a filter list in steps 243 and 244 respectively. According to one embodiment, the method of FIG. 24 operates as part of the method of FIGS. 1–23 and linked sites are defined as undesirable sites and added to the filter list already being used. According to another embodiment, the defined sites are used to create a new filter list. Other embodiments are possible.

Figure 25:
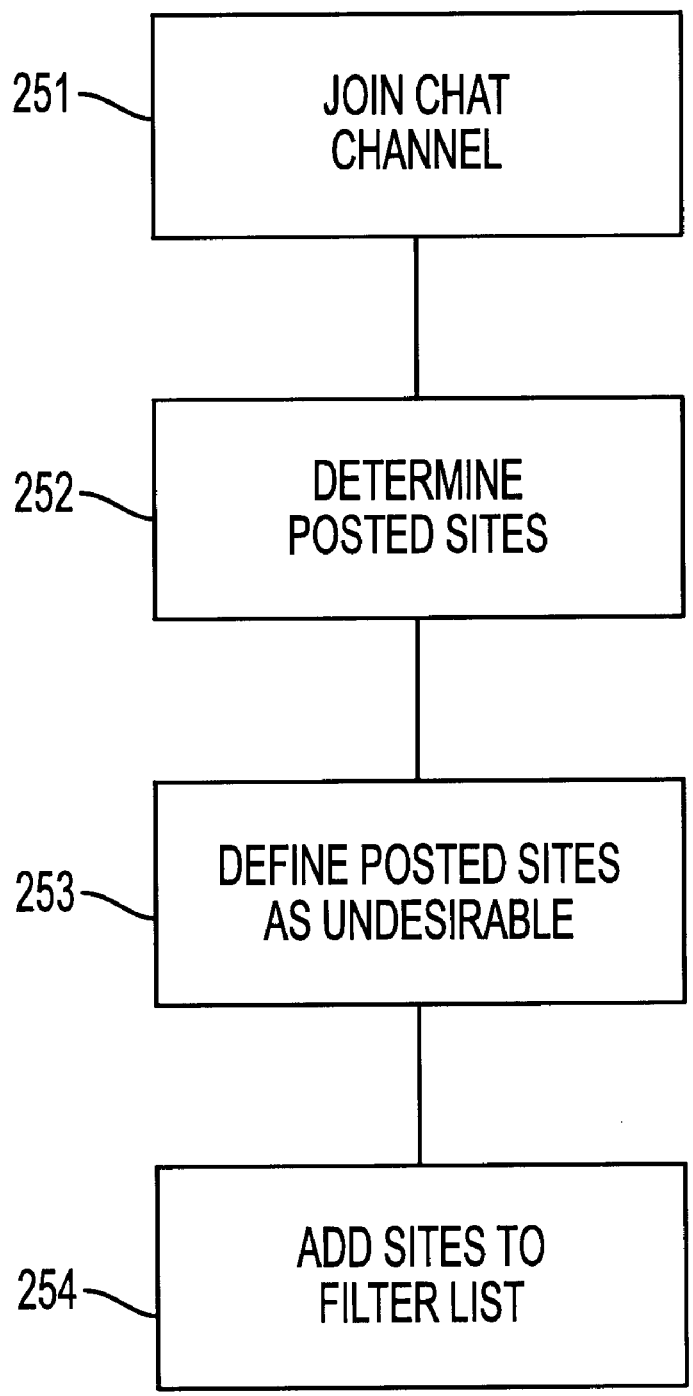
FIG. 25 is a flow chart indicating a method for creating a filter list according to another embodiment of the present invention.

FIG. 25, is a flow chart that illustrates a method of creating a filter list in conjunction with a known undesirable chat room or newsgroup. The method proceeds similar to the method of FIG. 24 and begins by joining a chat room that is known to be undesirable (step 251). According to one embodiment, the undesirable chat room is derived from a filter list, such as is mentioned in conjunction with FIGS. 1–23, and joined to by entering its site address (e.g., its URL). According to other embodiments, the undesirable chat room may be chosen and joined in any of a number of conventional ways.

A list of sites that are posted to the undesirable chat room is developed in step 252. According to one embodiment, the list of posted sites is developed by scanning the undesirable chat room for all posted sites and adding those sites to a list of undesirable sites. According to one embodiment, a search algorithm similar to the URL scanning method described above is used. According to this embodiment, instead of looking for undesirable words, patterns such as "http//" are searched for in order to identify all posted sites. After identifying sites, the sites are then scanned for particular words and patterns (as described above) to insure they are inappropriate. Other methods of identifying posted sites are possible.

The determined posted sites are defined as undesirable and added to a filter list in steps 253 and 254 respectively. According to one embodiment, the method of FIG. 25 operates as part of the method of FIGS. 1–23 and the posted sites are defined as undesirable sites and added to the filter list already being used. According to another embodiment, the defined sites are used to create a new filter list. Other embodiments are possible.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A system for determining undesirable content on a public network comprising:
   at least one computer;
   an interface for facilitating communication between the computer and the public network, the interface comprising local storage;
   means for scanning the local storage of the interface for undesirable content; and,
   means for determining the location of undesirable content within the public network,
   wherein the location is used to update a filter list.

2. The system of claim 1 wherein the public network comprises the Internet.

3. The system of claim 2 further comprising:
   means for uploading the determined locations to a central website; and,
   means for redistributing information regarding the determined locations.

4. The system of claim 3 wherein the information regarding the determined locations is redistributed on a periodic basis.

5. The system of claim 3 wherein the information regarding the determined locations is redistributed in near real-time.

6. The system of claim 2, further comprising means for adding determined locations to a filter list.

7. The system of claim 1 wherein the public network comprises the Internet and the means for determining the location of undesirable content comprises means for identifying URLs for locations at which undesirable content is found.

8. The system of claim 1 wherein the interface comprises a proxy server.

9. The system of claim 1 wherein the interface comprises a firewall.

10. The system of claim 1 wherein the local storage comprises cache.

11. In a system for accessing content from a public network, the system comprising at least one computer and an interface for facilitating communication between the computer and the public network, the interface comprising local storage, a method for determining undesirable content on the public network, the method comprising the steps of:

scanning the local storage of the interface for undesirable content; and determining the locations of undesirable content within the network; and updating a filter list based on the step of determining the locations.

12. The method of claim 1 wherein the public network comprises the Internet.

13. The method of claim 12 further comprising the steps of:

uploading the determined locations to a central website; and redistributing information regarding the determined locations.

14. The method of claim 13 wherein the information regarding the determined locations is redistributed on a periodic basis.

15. The method of claim 13 wherein the information regarding the determined locations is redistributed in near real-time.

16. The method of claim 1 wherein the public network comprises the Internet and the step of determining the location of undesirable content comprises identifying URLs for locations at which undesirable content is found.

17. The method of claim 16, wherein the step of updating comprises adding identified URLs to the filter list.

18. The method of claim 1 wherein the interface comprises a proxy server.

19. The method of claim 1 wherein the interface comprises a firewall.

20. The method of claim 1 wherein the local storage comprises cache.

21. A method of processing filter lists for monitoring attempts to access inappropriate material in a private network having an interface to a public network, comprising:

scanning information in a local memory associated with the interface, the information comprising information accessed from the public network;

identifying locations in the public network corresponding to inappropriate material detected in the information;

updating a filter list based on the identified locations; and uploading the identified locations or the updated filter list to a public network site.

22. The method of claim 21, further comprising the step of filtering using the updated filter list.

23. The method of claim 22, wherein the step of filtering comprises sending a notice to an administrator when a user exhibits a disproportionate rate of attempted access to sites in the updated filter list, wherein the rate is considered disproportionate based on a time interval or based on a comparison to other users.

24. The method of claim 21, wherein the identified locations or the updated filter list is made available on the public network site for redistribution.

25. The method of claim 21, wherein the step of identifying comprises processing URLs to identify the inappropriate material.

26. The method of claim 21, wherein the step of identifying comprises processing URLs and web page content to identify the inappropriate material.

27. A system for processing filter lists for monitoring attempts to access inappropriate material in a private network having an interface to a public network, comprising:

means for scanning information in a local memory associated with the interface, the information comprising information accessed from the public network;

means for identifying locations in the public network corresponding to inappropriate material;

means for updating a filter list based on the identified locations; and means for uploading the identified locations or the updated filter list to a public network site.

28. The system of claim 27, wherein the means for identifying is adapted to process URLs in order to identify the inappropriate material.

29. A computer program implemented on a memory for performing the following operations:

scanning information in a local memory associated with the interface, the information comprising information accessed from the public network;

identifying locations in the public network corresponding to inappropriate material;

updating a filter list based on the identified locations; and uploading the identified locations or the updated filter list to a public network site.

* * * * *